(12) United States Patent
Shen et al.

(10) Patent No.: US 11,855,875 B2
(45) Date of Patent: Dec. 26, 2023

(54) NETWORK TOPOLOGY DISCOVERY METHOD AND NODE DEVICE

(71) Applicant: HUAWEI TECHNOLOGIES CO., LTD., Guangdong (CN)

(72) Inventors: Li Shen, Nanjing (CN); Hanyu Wei, Nanjing (CN); Yinliang Hu, Nanjing (CN); Duoliang Fan, Nanjing (CN); Yunping Lyu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/731,686

(22) Filed: Apr. 28, 2022

(65) Prior Publication Data

US 2022/0255836 A1    Aug. 11, 2022

Related U.S. Application Data

(63) Continuation of application No. PCT/CN2020/124378, filed on Oct. 28, 2020.

(30) Foreign Application Priority Data

Oct. 31, 2019    (CN) .......................... 201911053346.7

(51) Int. Cl.
*H04L 45/02*    (2022.01)
*H04L 45/12*    (2022.01)
*H04L 45/42*    (2022.01)

(52) U.S. Cl.
CPC ............ *H04L 45/02* (2013.01); *H04L 45/124* (2013.01); *H04L 45/42* (2013.01)

(58) Field of Classification Search
CPC ........ H04L 45/02; H04L 45/124; H04L 45/42
(Continued)

(56) References Cited

U.S. PATENT DOCUMENTS 5,506,838 A * 4/1996 Flanagan ................ H04L 45/44
                                                              370/258
9,210,073 B2 * 12/2015 Wrenn .................... H04L 67/10
(Continued)

FOREIGN PATENT DOCUMENTS

CN    102916884 A    2/2013
CN    103905221 A    7/2014
(Continued)

OTHER PUBLICATIONS

Nehra Ajay et al: "SLDP: A secure and lightweight linkdiscovery protocol for software defined networking", Computer Networks,vol. 150, Dec. 25, 2018 (Dec. 25, 2018), pp. 102-116,XP085592653, ISSN:1389-1286, DOI:10.1016/J.COMNET.2018.12.014.
(Continued)

*Primary Examiner* — Anthony Mejia
(74) *Attorney, Agent, or Firm* — WOMBLE BOND DICKINSON (US) LLP

(57) ABSTRACT

This application discloses a network topology discovery method and a node device. In this application, a root node device sends a link discovery message to a child node device through a first port; receives a link discovery acknowledge message sent by the child node device through a second port of the child node device, where the link discovery acknowledge message includes an identifier of the child node device and an identifier of the second port; and determines a first link based on the link discovery acknowledge message, where the first link is a link between the first port and the second port. According to the solutions of this application, when detecting that a link of a port is connected, the node device discovers an existing topology relationship through message interaction, so as to implement network topology discovery.

19 Claims, 14 Drawing Sheets

(58) Field of Classification Search
USPC .......................................................... 709/238
See application file for complete search history.

(56) References Cited

U.S. PATENT DOCUMENTS

| | | |
|---|---|---|
| 2002/0154606 A1 | 10/2002 | Duncan et al. |
| 2003/0156552 A1* | 8/2003 | Banker ................ H04L 45/02 370/266 |
| 2003/0223377 A1* | 12/2003 | Simmons ............. H04L 45/02 370/254 |
| 2007/0097880 A1* | 5/2007 | Rajsic .................. H04L 41/12 370/254 |
| 2012/0327766 A1 | 12/2012 | Tsai et al. |
| 2014/0047056 A1* | 2/2014 | Tahara ................. H04L 69/40 709/208 |
| 2014/0071810 A1* | 3/2014 | Kumagai ........... H04L 41/0654 370/220 |
| 2014/0185461 A1* | 7/2014 | Gautreau ............. H04L 49/00 370/244 |
| 2014/0211661 A1* | 7/2014 | Gorkemli ............. H04L 43/20 370/255 |
| 2015/0264623 A1* | 9/2015 | Frost .................... H04W 40/00 370/335 |
| 2017/0366441 A1* | 12/2017 | Hill ...................... H04L 43/50 |
| 2021/0263503 A1* | 8/2021 | Lei ..................... G05B 19/4183 |

FOREIGN PATENT DOCUMENTS

| | | |
|---|---|---|
| CN | 105376164 A | 3/2016 |
| CN | 105991435 A | 10/2016 |
| CN | 105827439 B | 2/2019 |
| CN | 110545194 A | 12/2019 |
| WO | 2019228251 A1 | 12/2019 |

OTHER PUBLICATIONS

IEEE Std 802.1BR-2012, IEEE Standard forLocal and metropolitan area networks Virtual Bridged Local Area Networks Bridge Port Extension, 135 pages.

Shao Xi et al., Research on Music Emotion Classification Based on Music Content and Lyrics, Computer Technology and Development, Aug. 2015, with an English abstract, total 5 pages.

* cited by examiner

NETWORK TOPOLOGY DISCOVERY METHOD AND NODE DEVICE

CROSS-REFERENCE TO RELATED APPLICATIONS

This application is a continuation of International Application No. PCT/CN2020/124378, filed on Oct. 28, 2020, which claims priority to Chinese Patent Application No. 201911053346.7, filed on Oct. 31, 2019. The disclosures of the aforementioned applications are hereby incorporated by reference in their entireties.

TECHNICAL FIELD

This application relates to the computer field, and in particular, to a network topology discovery method and a node device.

BACKGROUND

As a network scale is enlarged, there are more and more topology-based network application scenarios. Therefore, a topology is a core of the entire network operation. However, as a quantity of network nodes increases, a quantity of ports increases exponentially, and it becomes very difficult to configure or discover the topology manually.

SUMMARY

This application provides a network topology discovery method and a node device, to implement topology discovery.

According to a first aspect, a network topology discovery method is provided. The method includes: sending a link discovery message to a child node device through a first port; receiving a link discovery acknowledge message sent by the child node device through a second port of the child node device, where the link discovery acknowledge message includes an identifier of the child node device and an identifier of the second port; and determining a first link based on the link discovery acknowledge message, where the first link is a link between the first port and the second port.

When detecting that a link of a port is connected, a root node device discovers an existing topology relationship through message interaction, so as to implement network topology discovery.

In an embodiment, the method further includes: before the sending a link discovery message to a child node device through a first port, detecting that a link corresponding to the first port is connected.

Discovery of a link may be triggered when a root node device detects that a link corresponding to a port of the root node device is connected, and the root node device does not need to perform network topology discovery all the time.

In another embodiment, the method further includes: indicating, based on the first link, the child node device to set the second port to an uplink port.

For a discovered network topology, at least one port of the child node device needs to be indicated as an uplink port, so as to communicate with the root node device.

In another embodiment, the indicating, based on the first link, the child node device to set the second port to an uplink port includes: sending a port role update message to the child node device through the first port, where the port role update message includes the identifier of the child node device, the identifier of the second port, and role information of the second port, and the port role update message is used to indicate the child node device to set a role based on the role information of the second port; and receiving a port role update acknowledge message sent by the child node device through the second port.

In another embodiment, the method further includes: if the child node device is a first-time discovery device, sending a device discovery message to the child node device through the first port, where the device discovery message includes the identifier of the child node device; and receiving a device discovery acknowledge message sent by the child node device through the second port, where the device discovery acknowledge message includes the identifier of the child node device, and identifiers, statuses, and port capabilities of all ports of the child node device.

Through device discovery, the root node device may learn identifiers, statuses, and port capabilities of all ports of a new device, so as to communicate with the new device.

In another embodiment, a first child node device is directly connected to the root node device, and a second child node device is indirectly connected to the root node device. Before the sending a link discovery message to a child node device through a first port, the method further includes: receiving a port status change message sent by the first child node device, where the port status change message is used to indicate that there is a link connection between a third port of the first child node device and a fourth port of the second child node device.

When a directly connected device detects that a status of a port between the directly connected device and an indirectly connected device changes, the directly connected device reports the status change to the root node device, so that the root node device discovers a topology relationship between the directly connected device and the indirectly connected device.

In another embodiment, the link discovery message includes an identifier of at least one egress port, the port role update message includes an identifier of at least one egress port, and the device discovery message includes an identifier of at least one egress port.

When the child node device (which may be a directly connected device or an indirectly connected device) forwards a message, the root node device adds an identifier of at least one egress port into the message, to indicate that the child node device forwards the message based on the identifier of the egress port without a need to process the message.

In another embodiment, the method further includes: when it is detected that a status of the first link changes, determining a child node device whose port role needs to be updated; sending, through a second link, the port role update message to the child node device whose port role needs to be updated, where the port role update message includes an identifier of an egress port of an intermediate child node device between the root node device and the child node device whose port role needs to be updated; and receiving the port role update acknowledge message.

When detecting that a status of a link changes, the root node device may re-modify a role of a port of a child node device on the link through calculation, so as to refresh a topology structure.

According to a second aspect, a network topology discovery method is provided. The method includes: receiving a link discovery message sent by a root node device, where the link discovery message includes an identifier of a third port; forwarding the link discovery message to a second child node device through the third port; receiving a link discovery acknowledge message sent by the second child node device through a fourth port, where the link discovery acknowledge message includes an identifier of the second child node device and an identifier of the fourth port; and sending the link discovery acknowledge message to the root node device.

In an embodiment, the method further includes: detecting that there is a link connection between the third port of a first child node device and the fourth port of the second child node device; sending a port status change message to the root node device, where the port status change message is used to indicate that there is a link connection on the third port.

In another embodiment, the method further includes: receiving a port role update message sent by the root node device, where the port role update message includes the identifier of the second child node device, the identifier of the third port, the identifier of the fourth port, and role information of the fourth port, and the port role update message is used to indicate the second child node device to set a role based on the role information of the fourth port; sending the port role update message to the second child node device through the third port; receiving, through the fourth port, a port role update acknowledge message sent by the second child node device; and sending the port role update acknowledge message to the root node device.

In another embodiment, the method further includes: if the second child node device is a first-time discovery device, receiving a device discovery message sent by the root node device, where the device discovery message includes the identifier of the second child node device and the identifier of the third port; sending, through the third port, the device discovery message to the second child node device; receiving, through the fourth port, a device discovery acknowledge message sent by the second child node device, where the device discovery acknowledge message includes the identifier of the second child node device, and identifiers, statuses, and port capabilities of all ports of the second child node device; and sending the device discovery acknowledge message to the root node device.

According to a third aspect, a network topology discovery method is provided. The method includes: receiving a link discovery message sent by a root node device through a first port; and sending a link discovery acknowledge message to the root node device through a second port, where the link discovery acknowledge message includes an identifier of a child node device and an identifier of the second port.

In an embodiment, the method further includes: receiving a port role update message sent by the root node device through the first port, where the port role update message includes the identifier of the child node device, the identifier of the second port, and role information of the second port, and the port role update message is used to indicate the child node device to set a role based on the role information of the second port; setting a role for the second port based on the role information of the second port; and sending a port role update acknowledge message to the root node device through the second port.

In another embodiment, the method further includes: if the child node device is a first-time discovery device, receiving a device discovery message sent by the root node device through the first port, where the device discovery message includes the identifier of the child node device; and sending a device discovery acknowledge message to the root node device through the second port, where the device discovery acknowledge message includes the identifier of the child node device, and identifiers, statuses, and port capabilities of all ports of the child node device.

In another embodiment, a first child node device is directly connected to the root node device, and a second child node device is indirectly connected to the root node device. The method further includes: sending a port status change message to the root node device, where the port status change message is used to indicate that there is a link connection between a third port of the first child node device and a fourth port of the second child node device.

In another embodiment, the link discovery message includes an identifier of at least one egress port, the port role update message includes an identifier of at least one egress port, and the device discovery message includes an identifier of at least one egress port.

According to a fourth aspect, a node device is provided. The node device is configured to implement a behavior function of the root node device in the method according to any one of the first aspect or the embodiments of the first aspect. The function may be implemented by hardware, or may be implemented by hardware executing corresponding software. The hardware or the software includes one or more modules corresponding to the foregoing function.

According to a fifth aspect, a child node device is provided. The child node device is configured to implement a behavior function of an intermediate child node device in the method according to any one of the second aspect or the embodiments of the second aspect. The function may be implemented by hardware, or may be implemented by hardware executing corresponding software. The hardware or the software includes one or more modules corresponding to the foregoing function.

According to a sixth aspect, a child node device is provided. The child node device is configured to implement a behavior function of the child node device in the method according to any one of the third aspect or the embodiments of the third aspect. The function may be implemented by hardware, or may be implemented by hardware executing corresponding software. The hardware or the software includes one or more modules corresponding to the foregoing function.

According to a seventh aspect, a node device is provided. The node device includes a processor and a physical interface. The processor is configured to perform the method according to any one of the first aspect or the embodiments of the first aspect.

According to an eighth aspect, a node device is provided. The node device includes a processor and a physical interface. The processor is configured to perform the method according to any one of the second aspect or the embodiments of the second aspect.

According to a ninth aspect, a node device is provided. The node device includes a processor and a physical interface. The processor is configured to perform the method according to any one of the third aspect or the embodiments of the third aspect.

According to a tenth aspect, a computer-readable storage medium is provided. The computer-readable storage medium stores instructions. When the instructions are run on a computer, the computer is enabled to perform the methods according to the foregoing aspects.

According to an eleventh aspect, a computer program product including instructions is provided. When the computer program product runs on a computer, the computer is enabled to perform the methods according to the foregoing aspects.

According to a twelfth aspect, a communications system is provided. The communications system includes the foregoing node device.

DESCRIPTION OF EMBODIMENTS

The following describes embodiments of the present invention with reference to accompanying drawings in embodiments of the present invention.

Figure 1:
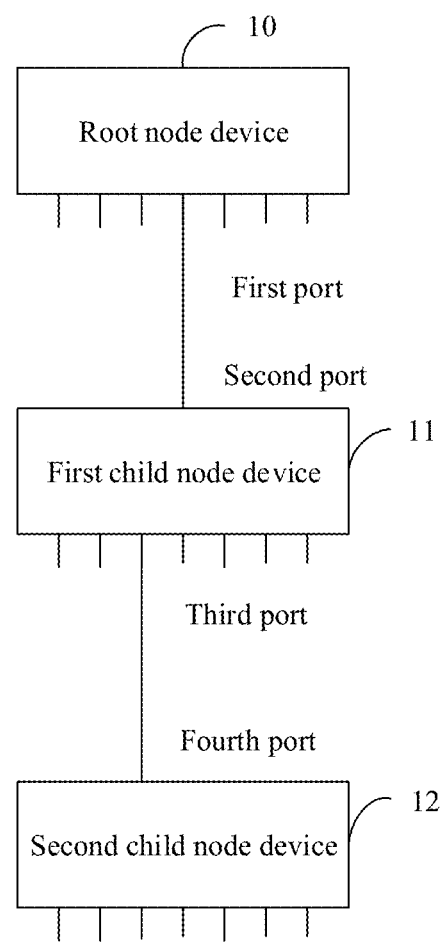
FIG. 1 is a schematic diagram of a network topology architecture according to an embodiment of this application.

FIG. 1 is a schematic diagram of a network topology architecture according to an embodiment of this application. The network topology architecture includes a root node device (Root) 10, one or more first child node devices 11 (only one first child node device is used as an example in the figure), and one or more second child node devices 12 (only one second child node device is used as an example in the figure). Certainly, the network topology architecture may alternatively include more child node devices. The root node device, the first child node device, and the second child node device each have one or more ports. In this example, a first port of the root node device is connected to a second port of the first child node device. A third port of the first child node device is connected to a fourth port of the second child node device. The root node device is directly connected to the first child node device. The second child node device is connected to the root node device through the first child node device. That is, the second child node device is indirectly connected to the root node device.

Figure 2:
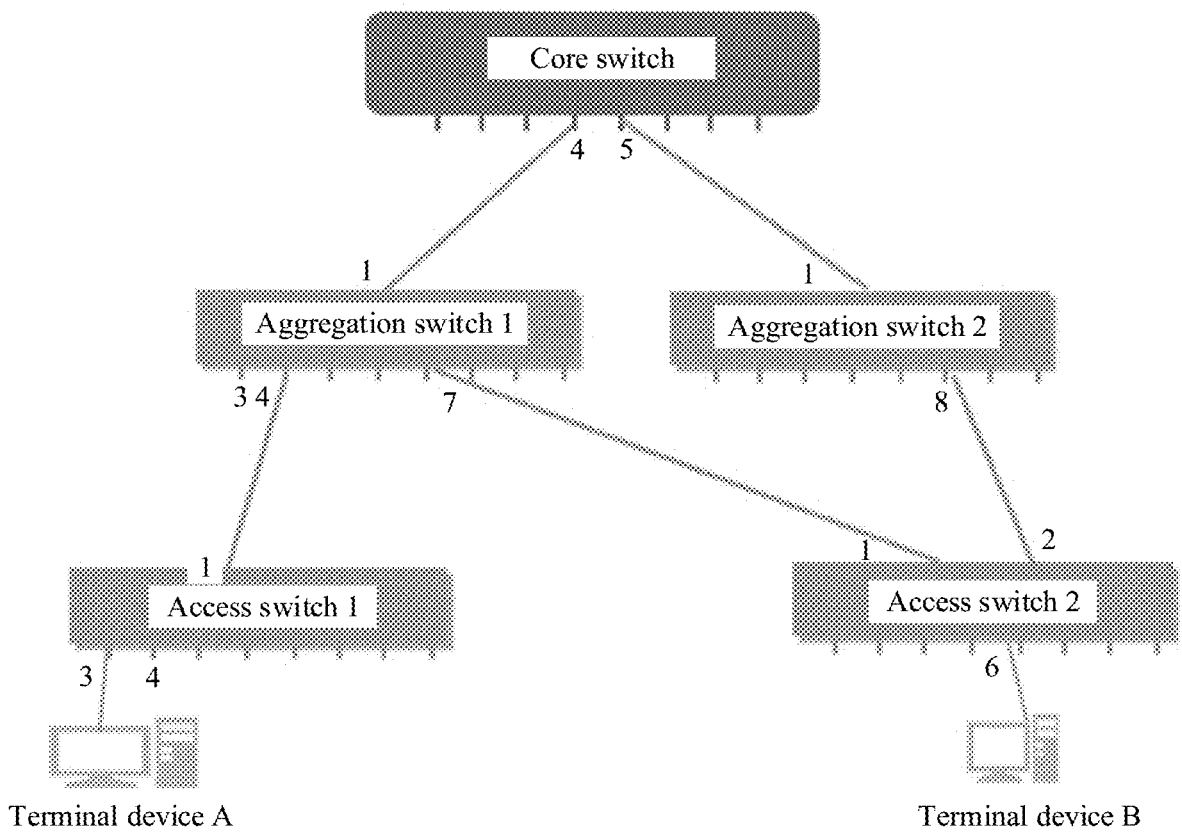
FIG. 2 is a schematic diagram of an enterprise network topology architecture according to a specific example.

A method in embodiments of this application may be applied to any network architecture, for example, an enterprise network, a campus network, or a data center network. FIG. 2 is a schematic diagram of an enterprise network topology architecture according to a specific example. A core switch serves as a Root switch of an entire network to discover an entire network topology. Theoretically, any switch in the network can serve as the Root switch, but the core switch at the top layer usually has a strongest control plane capability. A node that serves as the Root switch has a specific requirement on a control plane. Therefore, the core switch is usually selected as the Root switch. When there are a plurality of core switches, a core switch may be randomly selected and configured as the Root switch, or a switch that serves as the Root switch is selected from the plurality of core switches based on some election algorithms. In this example, the core switch is connected to a port 1 of an aggregation switch (AGG) 1 through a port 4. The core switch is connected to a port 1 of an aggregation switch 2 through a port 5. The port 4 of the aggregation switch 1 is connected to a port 1 of an access switch (ACC) 1. A port 7 of the aggregation switch 1 is connected to a port 1 of an access switch 2. A port 8 of the aggregation switch 2 is connected to a port 2 of the access switch 2. A terminal device A is connected to a port 3 of the access switch 1. A terminal device B is connected to a port 6 of the access switch 2. The foregoing network topology is only an example.

Embodiments of this application provide a network topology discovery solution, to implement automatic discovery of the foregoing network topology relationship.

The following provides a detailed description by using some specific embodiments.

Figure 3:
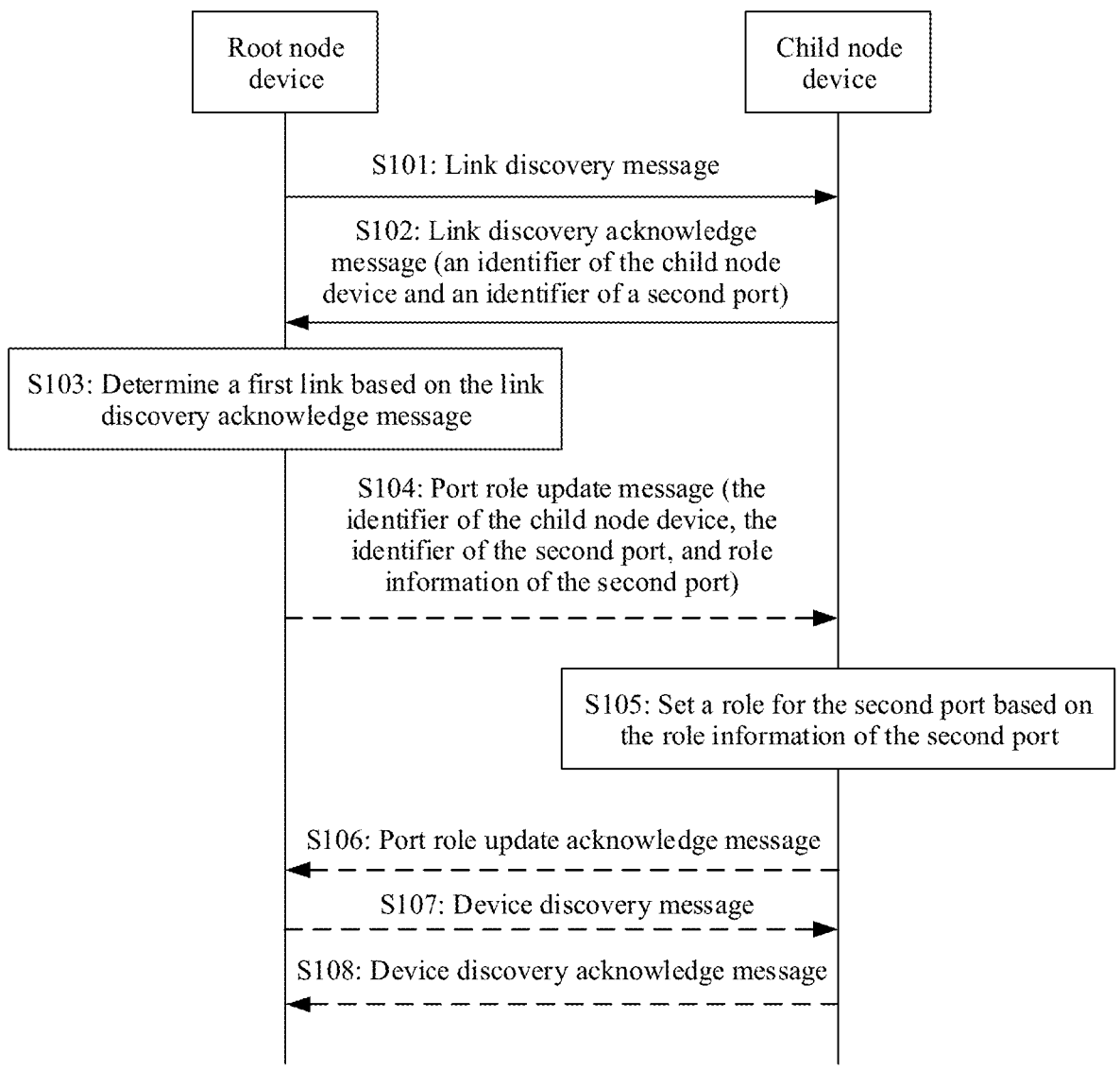
FIG. 3 is a schematic flowchart of a network topology discovery method according to an embodiment of this application.

FIG. 3 is a schematic flowchart of a network topology discovery method according to an embodiment of this application. The method may include the following operations.

Operation S101: A root node device sends a link discovery message to a child node device through a first port.

Correspondingly, the child node device receives the link discovery message.

As shown in the foregoing diagram of the system architecture, the root node device may be connected to one or more directly connected child node devices, or may be connected to one or more indirectly connected child node devices through a directly connected child node device. A child node device at a peer end of a to-be-discovered link may be a directly connected child node device of the root node device, or may be an indirectly connected child node device of the root node device.

When there is a to-be-discovered link between the root node device and the child node device, the root node device sends the link discovery message to the child node device through the first port, to perform a link discovery procedure.

Before operation S101, the method may further include: detecting that a link corresponding to the first port is connected. When the root node device detects that the link corresponding to the first port of the root node device is connected, a link between the root node device and the directly connected child node device is connected. When the root node device receives a port status change message reported by the directly connected child node device, a port corresponding to the directly connected child node device is connected, and a link between the directly connected child node device and an indirectly connected child node device at a lower layer is connected. The root node device sends the link discovery message to the directly connected child node device, or sends the link discovery message to the indirectly connected child node device through a discovered directly connected child node device.

Operation S102: The child node device sends a link discovery acknowledge message through a second port of the child node device.

Correspondingly, the root node device receives the link discovery acknowledge message.

The child node device receives the link discovery message through a connected link (specifically, through the second port), and parses a type of the message as a link discovery message type. The child node device constructs the link discovery acknowledge message. The link discovery acknowledge message includes an identifier of the child node device and an identifier of the second port. The child node device sends the link discovery acknowledge message through the second port. Specifically, if the directly connected child node device makes an acknowledgement, the directly connected child node device sends the link discovery acknowledge message through the second port. If the indirectly connected child node device makes an acknowledgement, the indirectly connected child node device sends the link discovery acknowledge message through the discovered directly connected child node device.

Operation S103: The root node device determines a first link based on the link discovery acknowledge message. The first link is a link between the first port and the second port.

The root node device receives the link discovery acknowledge message through the connected link, parses a type of the message, and identifies that the message is a link discovery acknowledge message. The root node device parses out the identifier of the child node device and the identifier of the second port, and determines the first link. The first link is the link between the first port and the second port.

Further, the root node device indicates, based on the first link, the child node device to set the second port to an uplink port. For example, when the first link is a link on a shortest path from the root node device to the child node device, the root node device indicates the child node device to set the second port to the uplink port. That is, if the root node device calculates, through the shortest path, that the first link is on the shortest path, the second port needs to be set to the uplink port.

Specifically, in an embodiment, the root node device may indicate, in another interaction message, the child node device to set the second port to the uplink port.

In another embodiment, the root node device may alternatively indicate, by using a separate interaction message, the child node device to set the second port to the uplink port. The method may further include operations S104 to S106.

Operation S104: The root node device sends a port role update message to the child node device through the first port.

Correspondingly, the child node device receives the port role update message.

The root node device sends the port role update message to the directly connected child node device, or sends the port role update message to the indirectly connected child node device through the discovered directly connected child node device. The port role update message includes the identifier of the child node device, the identifier of the second port, and role information of the second port. The port role update message is used to indicate the child node device to set a role based on the role information of the second port. In this embodiment, the port role update message is used to indicate the child node device to set the second port to the uplink port.

Operation S105: The child node device sets a role for the second port based on the role information of the second port.

After receiving the port role update message, the child node device parses a type of the message, and identifies that the message is a port role update message. The child node device sets the second port to the uplink port based on the role information of the second port carried in the message.

Operation S106: The child node device sends a port role update acknowledge message through the second port.

Correspondingly, the root node device receives the port role update acknowledge message.

Specifically, if the directly connected child node device makes an acknowledgement, the port role update acknowledge message is sent to the root node device. If the indirectly connected child node device makes an acknowledgement, the port role update acknowledge message is forwarded through the directly connected child node device. The port role update acknowledge message is used to indicate whether setting a port role succeeds or fails.

If the child node device is a first-time discovery device, the method may further include operations S107 and S108.

Operation S107: The root node device sends a device discovery message to the child node device through the first port. The device discovery message includes the identifier of the child node device.

Correspondingly, the child node device receives the device discovery message.

The root node device sends the device discovery message to the directly connected child node device, or forwards the device discovery message to the indirectly connected child node device through the directly connected child node device.

Operation S108: The child node device sends a device discovery acknowledge message through the second port. The device discovery acknowledge message includes the identifier of the child node device, and identifiers, statuses, and port capabilities of all ports of the child node device.

Correspondingly, the root node device receives the device discovery acknowledge message.

After receiving the device discovery message, the child node device parses a type of the message, identifies that the type of the message is a device discovery message type, and constructs the device discovery acknowledge message. The device acknowledge message carries the identifier of the child node device, and device information such as the identifiers, statuses (up/down), and capabilities (for example, link bandwidths) of all ports of the child node device. The child node device sends the device discovery acknowledge message to the root node device through the second port.

According to the network topology discovery method provided in this embodiment of this application, when detecting that a link of a port is connected, a node device discovers an existing topology relationship through message interaction, so as to implement network topology discovery.

The following describes in detail the foregoing network topology discovery method from a directly connected scenario and an indirectly connected scenario.

Figure 4:
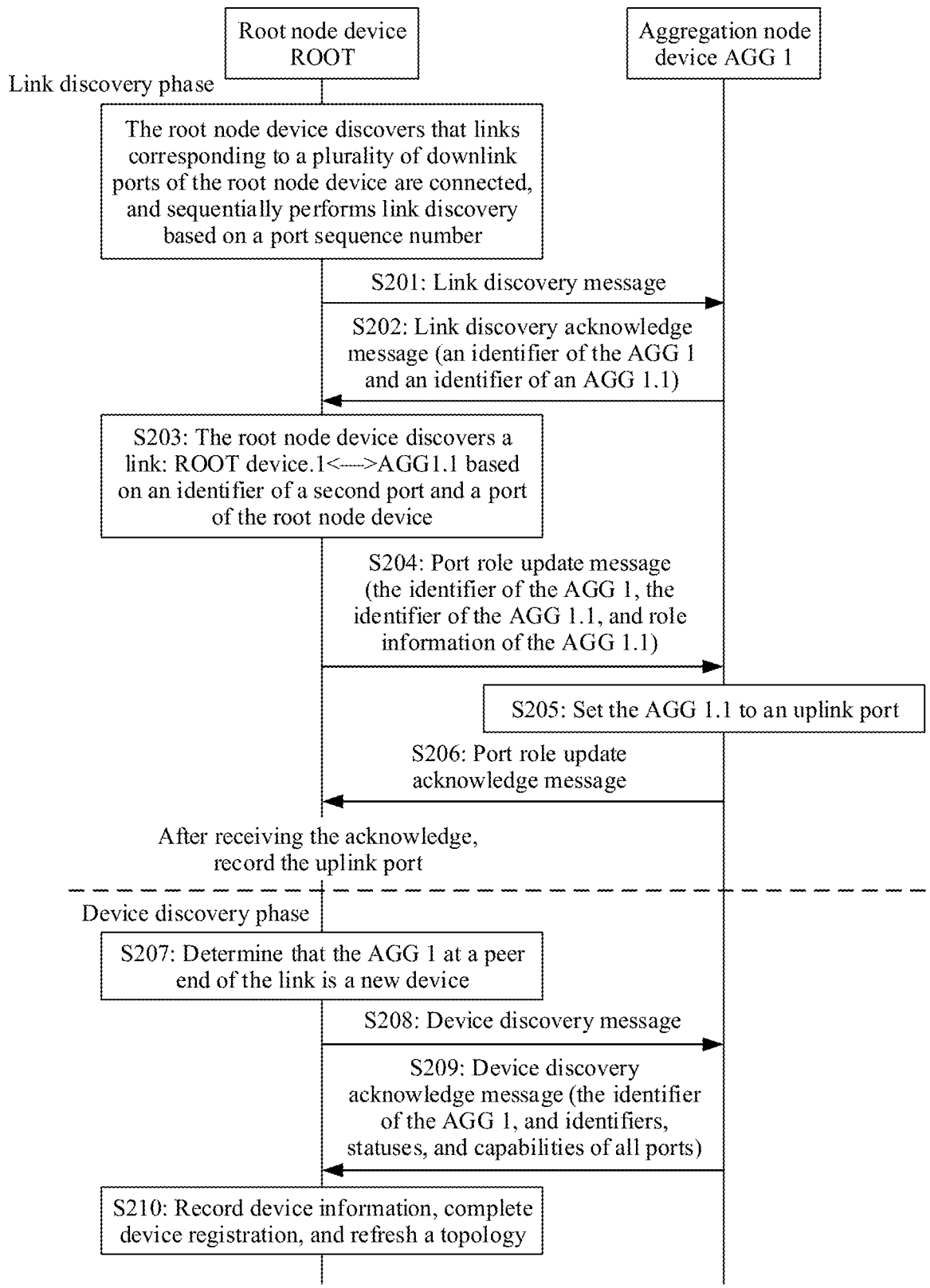
FIG. 4 is a schematic flowchart of a network topology discovery method in a directly connected scenario according to an embodiment of this application.
Figure 5:
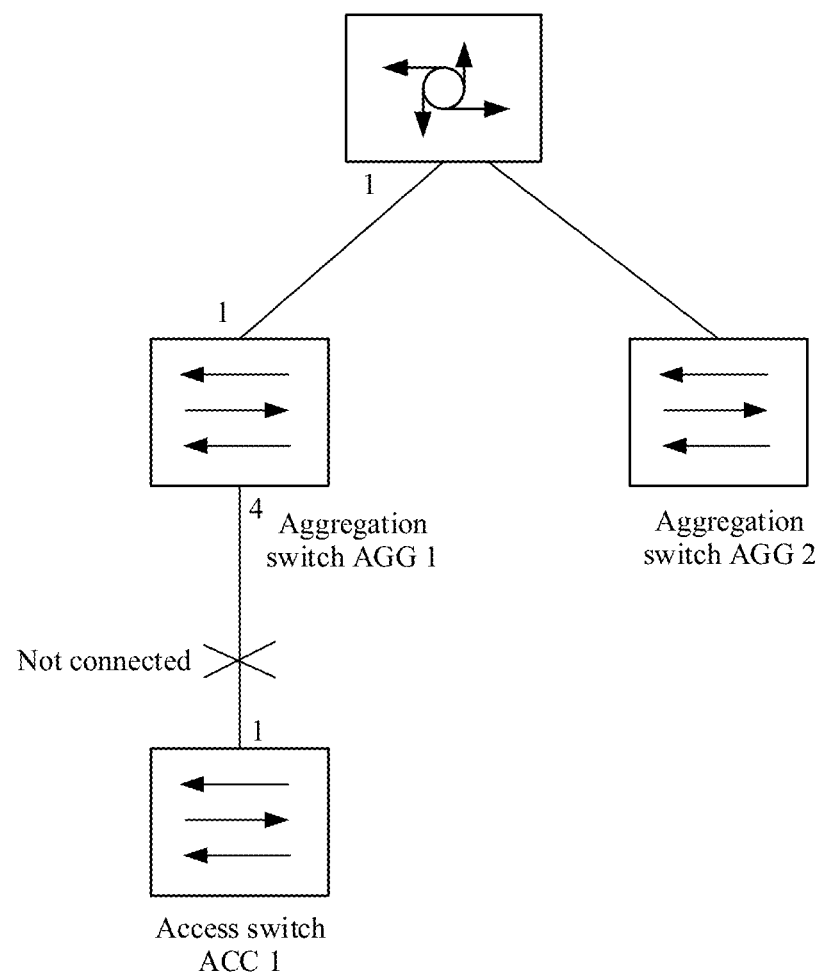
FIG. 5 is a schematic diagram of an enterprise network topology architecture in a directly connected scenario.

FIG. 4 is a schematic flowchart of a network topology discovery method in a directly connected scenario according to an embodiment of this application. This embodiment is described with reference to an enterprise network topology architecture in the directly connected scenario shown in FIG. 5. In FIG. 5, a root node device may be a core switch. Two node devices, that is, an AGG 1 and an AGG 2, are connected to the root node device. An ACC 1 is connected to the AGG 1. A link between the AGG 1 and the root node device and a link between the AGG 2 and the root node device are both connected, but the root node device does not discover network topology relationships between the root node device and the AGG 1 and between the root node device and the AGG 2. A link between the ACC 1 and the AGG 1 is not connected.

The network topology discovery includes two phases: a link discovery phase and a device discovery phase.

Link Discovery Phase:

The root node device discovers that links corresponding to a plurality of downlink ports of the root node device are connected, and sequentially performs link discovery based on a port sequence number. Specifically, discovery of a network topology relationship of a single link between the root node device and the AGG 1 is used as an example for description. A network topology of a link between the root node device and the AGG 2 is discovered in a similar way.

The root node device is connected to a port 1 of the AGG 1 through a port 1.

Operation S201: The root node device sends a link discovery message through the port 1.

Because a link between the port 1 of the root node device and the port 1 of the AGG 1 is connected, the root node device may send the link discovery message through the link. Correspondingly, the AGG 1 at a peer end of the link receives the link discovery message.

Specifically, the root node device may further start a timer after sending the link discovery message through the port 1, and wait for, within a timing time, an acknowledge message returned by a node device.

Operation S202: The AGG 1 sends a link discovery acknowledge message through the port 1 of the AGG 1.

After receiving the link discovery message, the AGG 1 parses a message type field. If the message is a link discovery message, the AGG 1 constructs the link discovery acknowledge message. The message carries a device identifier of the AGG 1 and an identifier of a receiving port AGG 1.1. The AGG 1 sends the link discovery acknowledge message through the AGG 1.1.

Operation S203: The root node device discovers a link: Root device.1<->AGG1.1 based on an identifier of the port 1 of the AGG 1 and an identifier of the port 1 of the root node device.

After receiving the link discovery acknowledge message, the root node device parses a message type field, determines that the message is a link discovery acknowledge message, and obtains the device identifier of the AGG 1 and the identifier of the receiving port AGG 1.1 that are carried in the message. Based on a port Root device.1 of the root node device that sends the link discovery message, the link: Root device.1<->AGG1.1 is discovered.

If the root node device does not receive the link discovery acknowledge message, possible causes are as follows: A peer child node device does not receive the link discovery message, a peer child node device does not support this message type, and a link discovery acknowledge message returned by the child node device is not received by the root node device. In this case, the root node device may repeatedly initiate the link discovery procedure after the timing time expires, until the link discovery acknowledge message is received. Alternatively, if a quantity of re-initiation times exceeds an upper limit, it indicates that discovery fails, and an exception is recorded.

Operation S204: The root node device sends a port role update message.

After discovering a new link, if the root node device calculates, through a shortest path first (shortest path first, SPF) algorithm, that the new link is on a shortest path, the root node device constructs the port role update message. The port role update message carries an identifier of a target device (the identifier of the AGG 1), an identifier of a target port (the identifier of the port AGG 1.1 of the AGG 1), and role information of the target port (the AGG 1.1). The root node device sends the port role update message to the AGG 1.

Operation S205: The AGG 1 sets the port AGG 1.1 to an uplink port based on the foregoing role information.

After receiving the port role update message, the AGG 1 parses a message type field, discovers that the type of the message is a port role update message, and parses the message to obtain the identifier of the AGG 1, the identifier of the port AGG 1.1 of the AGG 1, and the role information of the AGG 1.1. The device identifier obtained through parsing is compared with a local device identifier. If the identifiers are inconsistent, it indicates that the message is not sent to the AGG 1, and the message is discarded. Otherwise, a port indicated by the message is set to an indicated port role. In this example, if the target port is the AGG 1.1 and a role of the target port is an uplink port, the AGG 1 sets the AGG 1.1 to the uplink port.

Operation S206: The AGG 1 sends a port role update acknowledge message to the root node device.

The AGG 1 constructs the port role update acknowledge message, and sends the port role update acknowledge message to the root node device through the uplink port AGG 1.1.

After the root node device receives the port role update acknowledge message, it indicates that the port role is successfully set, and the uplink port that is successfully set is recorded.

Operation S207: The root node device determines that the AGG 1 at the peer end of the link is a new device.

The root node device determines whether a child node device at the peer end of the link is a new device discovered for the first time. If the child node device at the peer end of the link is not a new device discovered for the first time, the network topology discovery procedure ends. If the child node device is a new device discovered for the first time, the network topology discovery procedure proceeds to the device discovery phase. In this embodiment, the AGG 1 is a new device discovered for the first time.

Device Discovery Phase:

Operation S208: The root node device sends a device discovery message to the AGG 1.

The root node device sends the device discovery message through the local port Root device. 1 of the newly discovered link, starts the timer, and waits for an acknowledge message returned by the AGG 1.

Operation S209: The AGG 1 sends a device discovery acknowledge message to the root node device.

After receiving the device discovery message, the AGG 1 parses a type of the message, identifies that the type of the message is a device discovery message, and constructs the device discovery acknowledge message. The device acknowledge message carries the identifier of the AGG 1, and device information such as identifiers, statuses (up/down), and capabilities (for example, link bandwidths) of all ports of the AGG 1. The AGG 1 sends the device discovery acknowledge message to the root node device through the uplink port AGG 1.1.

After receiving the device acknowledge message, the root node device parses a type of the message, determines that the message is a device discovery acknowledge message, parses the device information carried in the message, records the device information, completes device discovery, and refreshes a topology.

If the root node device does not receive the device discovery acknowledge message, possible causes are as follows: The peer child node device does not receive the device discovery message, the peer child node device does not support this message type, and the device discovery acknowledge message returned by the child node device is not received by the root node device. In this case, the root node device may repeatedly initiate the device discovery procedure after a timing time expires, until the device discovery acknowledge message is received. Alternatively, if a quantity of re-initiation times exceeds an upper limit, it indicates that discovery fails, and an exception is recorded.

According to the network topology discovery method provided in this embodiment of this application, when detecting that a link of a port is connected, the root node device discovers an existing topology relationship through message interaction, so as to implement network topology discovery.

Figure 6A:
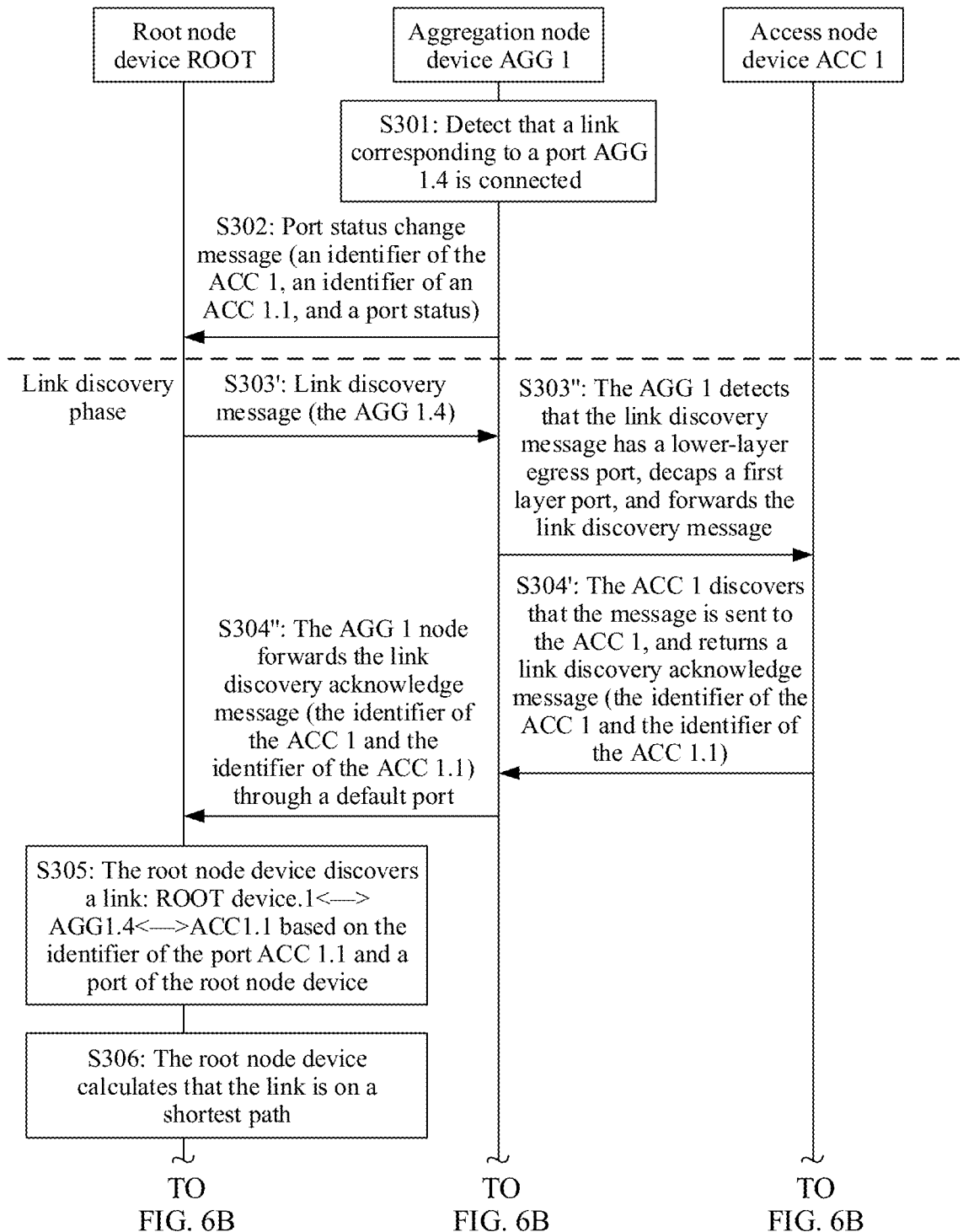
FIG. 6A and FIG. 6B are a schematic flowchart of a network topology discovery method in an indirectly connected scenario according to an embodiment of this application.
Figure 6B:
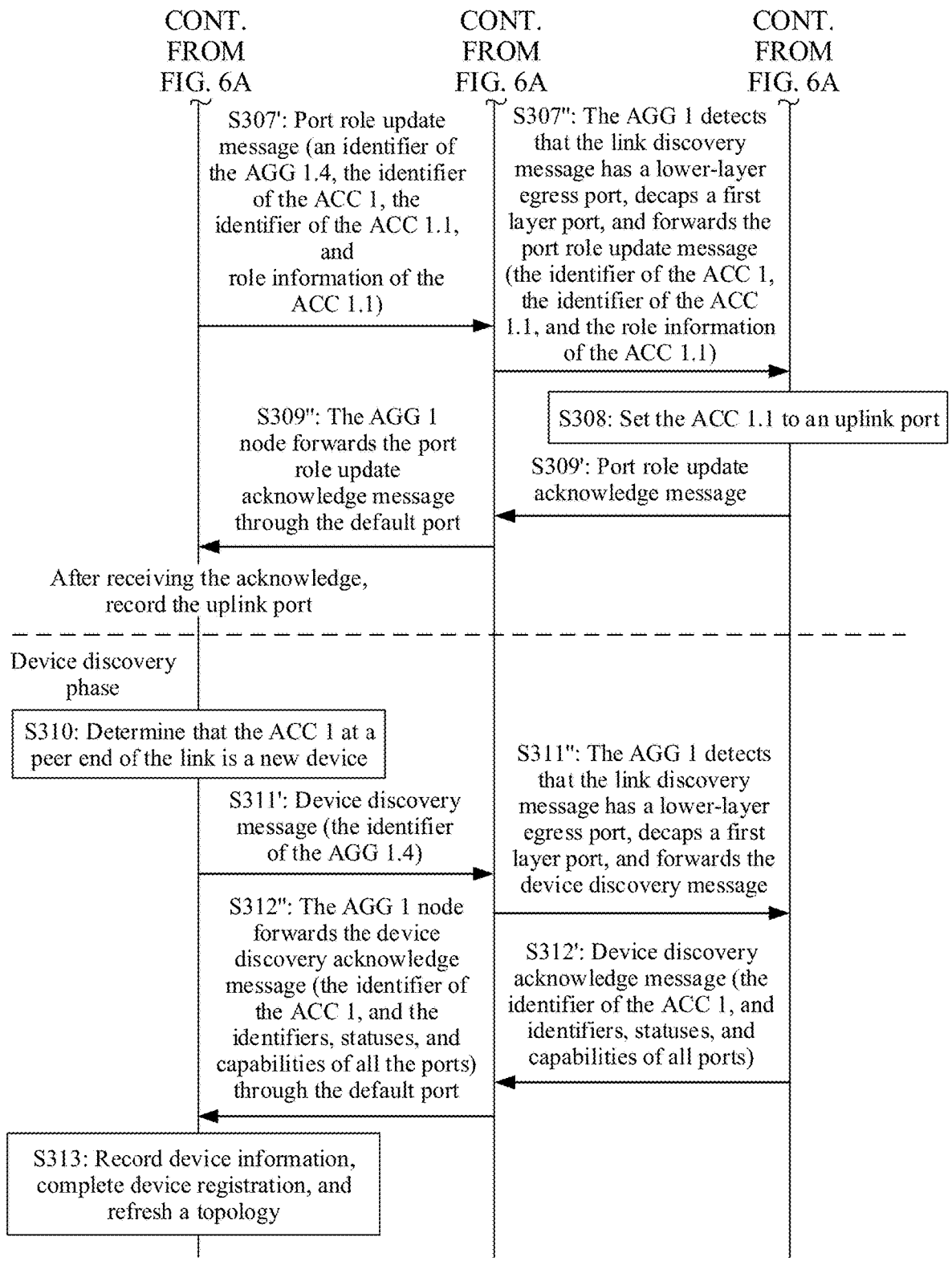
Figure 7:
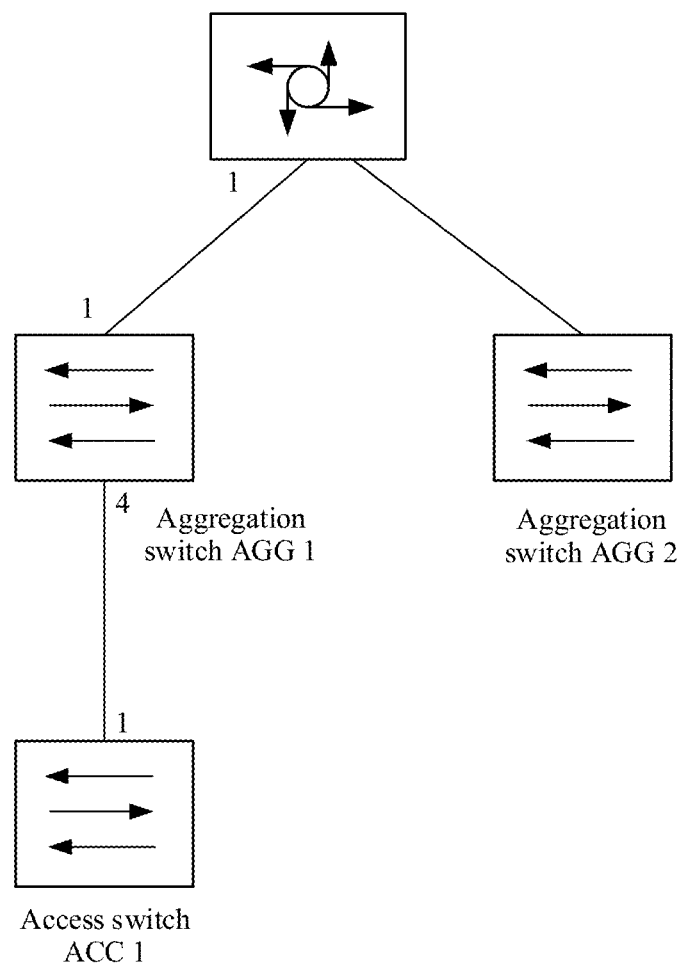
FIG. 7 is a schematic diagram of an enterprise network topology architecture in an indirectly connected scenario.

FIG. 6A and FIG. 6B are a schematic flowchart of a network topology discovery method in an indirectly connected scenario according to an embodiment of this application. This embodiment is described with reference to an enterprise network topology architecture in the indirectly connected scenario shown in FIG. 7. In FIG. 7, a root node device may be a core switch. Two node devices, that is, an AGG 1 and an AGG 2, are connected to the root node device. An ACC 1 is connected to the AGG 1. A link between the AGG 1 and the root node device and a link between the AGG 2 and the root node device are both connected, and the root node device has discovered network topology relationships between the root node device and the AGG 1 and between the root node device and the AGG 2. A link between the ACC 1 and the AGG 1 is connected, but the root node device does not discover a network topology relationship between the root node device and the ACC 1.

A difference from network topology discovery in the direct connected scenario lies in that, the network topology discovery not only includes two phases: a link discovery phase and a device discovery phase, and in the link discovery phase, an intermediate child node device further reports to the root node device that a link between the intermediate child node device and a node device at a lower layer is connected.

In FIG. 7, the intermediate child node device is the AGG 1.

Operation S301: The AGG 1 detects that a link corresponding to a port AGG 1.4 of the AGG 1 is connected.

The discovered directly connected device AGG 1 detects a port status change (the port AGG 1.4 changes from a down status to an up status). That is, the link corresponding to the AGG 1.4 is connected. The link corresponding to the AGG 1.4 is connected in the following two cases. In one case, the link corresponding to the AGG 1.4 is not connected before, but is connected now. In the other case, the link between the AGG 1 and the ACC 1 is connected, but the link between the AGG 1 and the root node device is not connected. In the foregoing embodiment, the link between the AGG 1 and the root node device is connected. Therefore, the AGG 1 can detect that the link corresponding to the AGG 1.4 is connected.

Operation S302: The AGG 1 sends a port status change message to the root node device.

The AGG 1 sends the port status change message to the root node device through an uplink port. The port status change message carries an identifier of the AGG 1, an identifier of the AGG 1.4, and a status (up) of the AGG 1.4.

After receiving the port status change message, the root node device parses a type of the message, identifies that the message is a port status change message, and parses out the identifier of the AGG 1, the identifier of the AGG 1.4, and the status (up) of the AGG 1.4 that are carried in the message. The procedure proceeds to the link discovery phase.

Link Discovery Phase:

Operation S303': The root node device sends a link discovery message.

A difference from link discovery in the foregoing embodiment lies in that, in this embodiment, the link discovery message needs to be sent to a new device through the AGG 1. A source routing manner may be used: The root node device calculates a shortest path of a device (that is, the AGG 1) that reports the port status change message (the root node device may alternatively calculate the shortest path in advance, and if there are a plurality of shortest paths, one shortest path is selected as a default path to receive and send a control plane message), and sends the link discovery message through a port corresponding to the AGG 1. The link discovery message carries the identifier of the egress port AGG 1.4 and may further carry a message type. The link discovery message is sent through a Root device. 1 port of the root node device.

Operation S303": The AGG 1 detects that the link discovery message has a lower-layer egress port, decaps a first layer port, and forwards the link discovery message.

After receiving the link discovery message, the AGG 1 detects that the link discovery message carries an egress port number, removes the identifier of the egress port, and forwards the link discovery message through the egress port that is parsed out.

Operation S304': The ACC 1 discovers that the link discovery message is sent to the ACC 1, and returns a link discovery acknowledge message.

The ACC 1 receives the link discovery message through the connected link between the ACC 1 and the AGG 1, and parses a type of the message. If the message does not carry an identifier of an egress port, it indicates that the message should be processed by the ACC 1. The ACC 1 parses the type of the message as a link discovery message type, and constructs the link discovery acknowledge message. The link discovery acknowledge message includes an identifier of the ACC 1 and an identifier of a port ACC 1.1 of the ACC 1. The ACC 1 sends the link discovery acknowledge message through a receiving port.

Operation S304": After receiving the link discovery acknowledge message, the AGG 1 forwards the link discovery acknowledge message to the root node device through a default port.

After receiving the link discovery acknowledge message through the connected link between the ACC 1 and the AGG 1, the AGG 1 forwards the link discovery acknowledge message to the root node device through a default uplink port. After discovering the AGG 1, the root node device may set one or more ports of the AGG 1 to one or more uplink ports, and may set one uplink port to the default port.

Operation S305: The root node device discovers a link Root device.1<->AGG1.1<->ACC1.1 based on the identifier of the port ACC 1.1 and a discovered link Root device.1<->AGG1.1.

After receiving the link discovery acknowledge message, the root node device parses a type of the message, identifies that the message is a link discovery acknowledge message, and parses out the identifier of the ACC 1 and the identifier of the port ACC 1.1 that are carried in the link discovery acknowledge message. Based on the discovered topology (Root device.1<->AGG1.1), the link: Root device.1<->AGG1.1<->ACC1.1 is discovered.

If the root node device does not receive the link discovery acknowledge message, possible causes are as follows: A peer child node device does not receive the link discovery message, a peer child node device does not support this message type, and a link discovery acknowledge message returned by the child node device is not received by the root node device. In this case, the root node device may repeatedly initiate the link discovery procedure after a timing time expires, until the link discovery acknowledge message is received. Alternatively, if a quantity of re-initiation times exceeds an upper limit, it indicates that discovery fails, and an exception is recorded.

Operation S306: The root node device calculates that the link is on the shortest path.

The root node device calculates that the link is on the shortest path based on an SPF algorithm (currently, only one link of the ACC 1 is connected to a discovered network, and therefore, the link is the shortest path). Therefore, the root node device needs to set an uplink port for the ACC 1.

Operation S307': The root node device sends a port role update message.

The root node device constructs the port role update message. The port role update message carries the identifier of the ACC 1, the identifier of the ACC 1.1, and role information of the ACC 1.1 (in this example, the ACC 1.1 is indicated to be set to an uplink port). Then the root node device encapsulates an identifier of an egress port (the identifier of the AGG 1.4) along the route, and sends the port role update message in the source routing manner.

Operation S307": The AGG 1 detects that the port role update message has a lower-layer egress port, decaps a first layer port, and forwards the port role update message to the ACC 1.

After receiving the port role update message, the AGG 1 detects that the message carries an egress port number, parses out the egress port number, removes the identifier of the egress port, and forwards the port role update message through the egress port that is parsed out.

Operation S308: The ACC 1 sets the ACC 1.1 to an uplink port based on the port role update message.

After the ACC 1 receives the port role update message, if the message does not carry an identifier of an egress port, it indicates that the message should be processed by the ACC 1 (in this example, there is only an identifier of one egress port, the identifier of the egress port has been removed by the AGG 1, and therefore, the message is processed by the ACC 1). The ACC 1 parses a type of the message as a port role update message type, and sets the ACC 1.1 to the uplink port based on the role information indicating updating.

Operation S309': The ACC 1 sends a port role update acknowledge message.

The ACC 1 constructs the port role update acknowledge message. The message is used to indicate that the setting is successful. The ACC 1 sends the message through the uplink port.

Operation S309": After receiving the port role update acknowledge message, the AGG 1 forwards the port role update acknowledge message through the default port.

After receiving the port role update acknowledge message, the root node device records the uplink port.

Operation S310: The root node device determines that the ACC 1 at a peer end of the link is a new device.

The root node device determines whether a child node device at the peer end of the link is a new device discovered for the first time. If the child node device at the peer end of the link is not a new device discovered for the first time, the network topology discovery procedure ends. If the child node device at the peer end of the link is a new device discovered for the first time, the network topology discovery procedure proceeds to the device discovery phase. In this embodiment, the ACC 1 is a new device discovered for the first time.

Device Discovery Phase:

Operation S311': The root node device sends a device discovery message. The device discovery message carries the identifier of the AGG 1.4.

Because the new device is an indirectly connected device of the root node device, the device discovery message is sent in the source routing manner. The root node device constructs the device discovery message, encapsulates an identifier of an egress port (the identifier of the AGG 1.4) along the route, and then sends the device discovery message in the source routing manner.

Operation S311": The AGG 1 detects that the link discovery message has a lower-layer egress port, decaps a first layer port, and forwards the device discovery message.

After receiving the device discovery message, the AGG 1 discovers that the message carries the identifier of the egress port, parses out the identifier of the egress port, removes the identifier of the egress port, and forwards the device discovery message through the egress port that is parsed out.

Operation S312': The ACC 1 sends a device discovery acknowledge message. The device discovery acknowledge message includes the identifier of the ACC 1, and identifiers, statuses, and capabilities of all ports of the ACC 1.

After receiving the device discovery message from the egress port, the ACC 1 detects that the message does not carry an identifier of an egress port, and it indicates that the message should be processed by the ACC 1 (in this example, there is only an identifier of one egress port, the identifier of the egress port has been removed by the AGG 1, and therefore, the message is processed by the ACC 1.). The ACC 1 parses a type of the message as a device discovery message type, constructs the device discovery acknowledge message that carries device information, such as the identifier of the ACC 1, the identifiers, statuses (up/down), and capabilities (for example, link bandwidths) of all the ports of the ACC 1, and sends the device discovery acknowledge message through the uplink port ACC 1.4.

Operation S312": After receiving the device discovery acknowledge message of the ACC 1, the AGG 1 forwards the device discovery acknowledge message through the default port.

Operation S313: The root node device records the device information, completes device registration, and refreshes a topology.

If the root node device does not receive the device discovery acknowledge message, possible causes are as follows: The peer child node device does not receive the device discovery message, the peer child node device does not support this message type, and the device discovery acknowledge message returned by the child node device is not received by the root node device. In this case, the root node device may repeatedly initiate the device discovery procedure after a timing time expires, until the device discovery acknowledge message is received. Alternatively, if a quantity of re-initiation times exceeds an upper limit, it indicates that discovery fails, and an exception is recorded.

Therefore, in this embodiment, the root node device initiates topology discovery in a centralized manner. The child node device makes only a simple acknowledgement and a most basic status report. Both calculation and status maintenance are supported by the root node device. A control plane of the child node device is simplified.

According to the network topology discovery method provided in this embodiment of this application, when detecting that the link to the port of the node device at the lower layer is connected, the intermediate child node device reports a status of the port to the root node device. The root node device discovers, through message interaction, an existing topology relationship between the root node device and the node device at the lower layer of the intermediate child node device, so as to implement network topology discovery.

Figure 8:
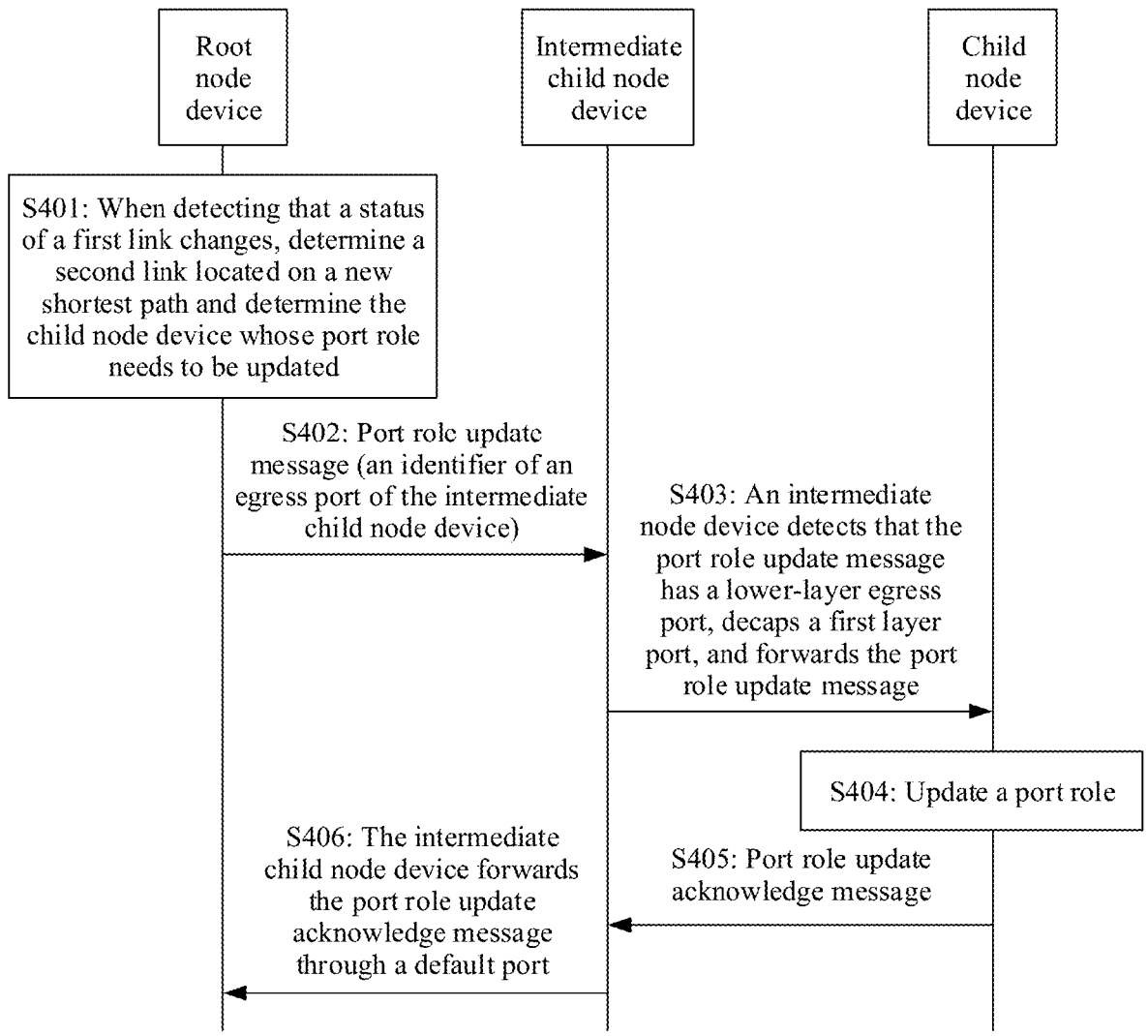
FIG. 8 is a schematic flowchart of another network topology discovery method according to an embodiment of this application.

When detecting that a status of the link changes, the root node device may re-modify a role of a port of the child node device on the link through calculation. FIG. 8 is a schematic flowchart of another network topology discovery method according to an embodiment of this application. The method may include the following operations.

Operation S401: When detecting that a status of a first link changes, a root node device determines a child node device whose port role needs to be updated.

When detecting that a status of a link corresponding to a port of the root node device changes, or receives a reported change of a link corresponding to a port of an indirectly connected child node device, the root node device may determine a new shortest path through SPF calculation. The root node device determines a second link that can reach the child node device whose link status changes, and determines the child node device whose port role needs to be updated.

Operation S402: The root node device sends a port role update message.

Because a shortest path is re-determined, a directly connected node device before a change may be updated to an indirectly connected node device. Therefore, the port role update message needs to be forwarded through another directly connected node device and/or indirectly connected node device (referred to as an "intermediate child node device"). The root node device constructs the port role update message. The port role update message carries an identifier of an egress port of an intermediate child node device, an identifier of a target port, and role information of the target port. The target port is a port whose role is to be updated.

Operation S403: The intermediate child node device detects that the port role update message has a lower-layer egress port, decaps a first layer port, and forwards the port role update message to a child node device at a lower layer.

The intermediate child node device receives the port role update message, and detects that the message includes the identifier of the egress port. Therefore, the intermediate child node device parses out the identifier of the egress port, removes the identifier of the egress port of the intermediate child node device, and forwards the message through the egress port that is parsed out.

Operation S404: The child node device updates a port role based on the port role update message.

Finally, the child node device receives the port role update message, detects that the message does not include an identifier of an egress port, and may determine that the message should be processed by the child node device. Therefore, a role of the target port is updated based on the role information of the target port carried in the message.

Operation S405: The child node device sends a port role update acknowledge message.

After updating the role of the target port, the child node device constructs the port role update acknowledge message. The acknowledge message is used to indicate whether a role update succeeds or fails.

Operation S406: After receiving the port role update acknowledge message, the intermediate child node device forwards the port role acknowledge message through a default port.

After receiving the port role update acknowledge message, the root node device records the port role as a downlink port.

Figure 9:
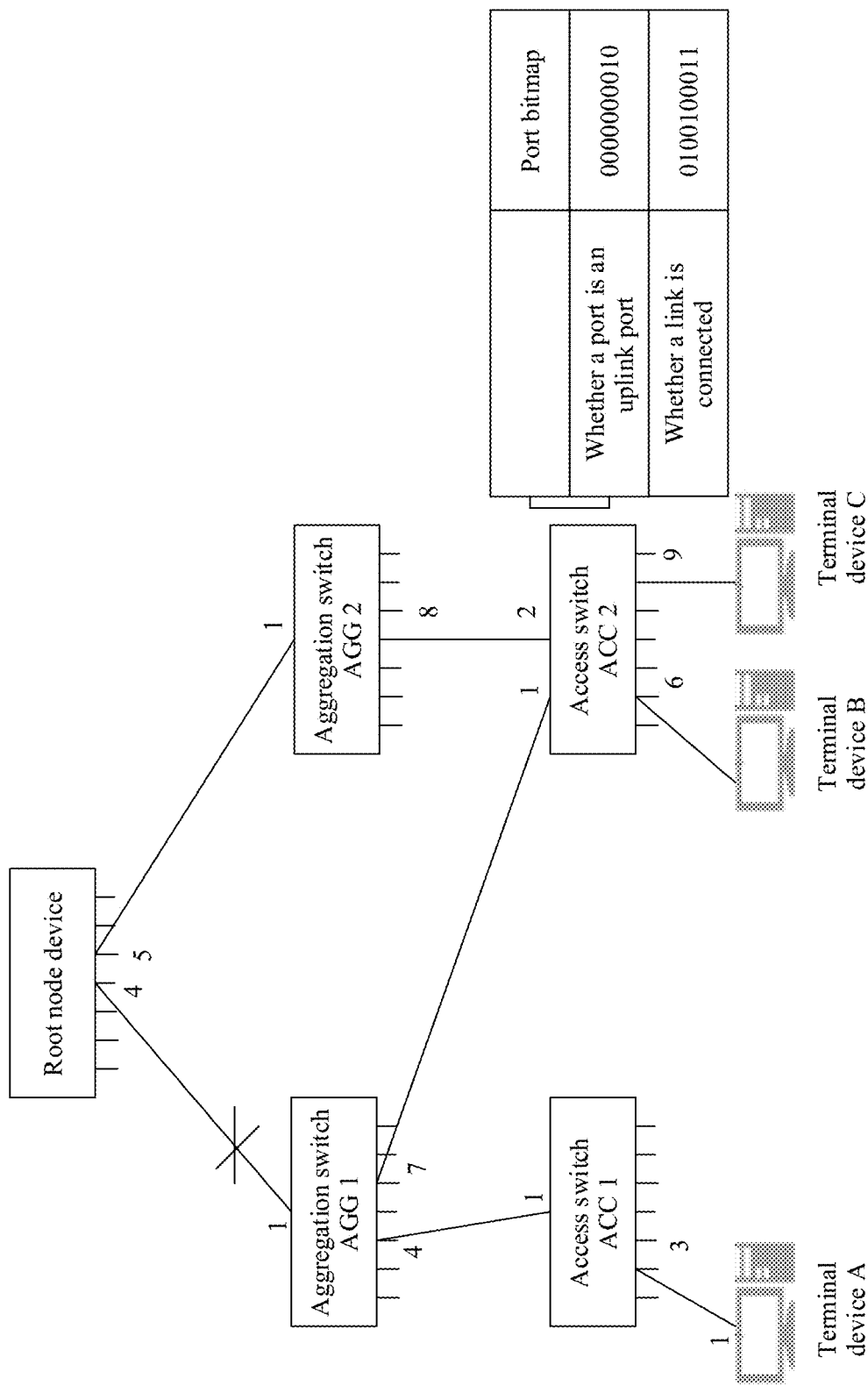
FIG. 9 is a schematic diagram of an example of a link status change.

Specifically, in a schematic diagram of a link status change shown in FIG. 9, the root node device detects a status change of a direct link (a link Root.4<->AGG1.1 is disconnected), and calculates a shortest path through an SPF algorithm. Through calculation, the root node device discovers that devices whose shortest paths change are an ACC 1, an ACC 2, and an AGG 1, and devices whose port roles need to be changed are the ACC 2 and the AGG 1.

Specifically, Root.4<->AGG1.1 and AGG1.7<->ACC2.1 is a shortest path. The ACC 2 may interact with the root node device and the AGG 1 through an uplink port ACC 2.1. However, the link: Root.4<->AGG1.1 is disconnected. Therefore, a shortest path from the root node device to the ACC 2 needs to be recalculated, and a role of the ACC 2.1 needs to be updated. Because the ACC 2 is an indirectly connected device of the root node device, a port role update message is sent in a source routing manner. The root node device constructs the port role update message. The message carries an identifier of a target device (an identifier of the ACC 2), an identifier of a target port (an identifier of the ACC 2.1), and role information. Then the root node device encapsulates an identifier of an egress port (an egress port AGG 2.8 of an AGG 2) along the route, and sends the port role update message to the ACC 2 in the source routing manner. After receiving the message, the AGG 2 discovers that the message carries the identifier of the egress port, parses out the identifier of the egress port, removes the identifier of the egress port, and forwards the message through the egress port that is parsed out. After receiving the message, the ACC 2 detects that the message does not carry an identifier of an egress port, and it indicates that the message should be processed by the ACC 2. The ACC 2 parses a type of the message as a port role update message type, further parses out the target port and the role information in the message, and updates the target port (the ACC 2.1) to a downlink port. The ACC 2 constructs a port role update acknowledge message and sends the message through the uplink port. After receiving the message, the AGG 2 forwards the message to the root node device through the uplink port. The message is used to indicate whether a role update succeeds or fails. The root node device receives the message. If the message indicates that the role update succeeds, it indicates that the operation succeeds. If the message indicates that the role update fails, it indicates that the operation fails.

As shown in FIG. 9, a port bitmap of the ACC 2 includes a bitmap of a port status and a bitmap of a link connection. In the bitmap of the port status and the bitmap of the link connection, identifiers of ports are ACC 2.1, ACC 2.2, . . . , and ACC 2.10 from right to left. In the bitmap of the port status, a bit "0" indicates that the port is a downlink port, and a bit "1" indicates that the port is an uplink port. Through the foregoing role update operation, the ACC 2.1 is updated from the uplink port to the downlink port, and a port status value of the ACC 2.1 is updated from the bit "1" to the bit "0". Similarly, a same role update operation may also be performed on the ACC 2.2. To be specific, the ACC 2.2 is updated from the downlink port to the uplink port, and a port status value of the ACC 2.2 is updated from the bit "0" to the bit "1". In the bitmap of the link connection, the bit "0" indicates that a link corresponding to the port is not connected, and the bit "1" indicates that a link corresponding to the port is connected. Currently, links of ports ACC 2.1, ACC 2.2, ACC 2.6, and ACC 2.9 are connected, and bit values corresponding to these ports are "1".

Figure 10:
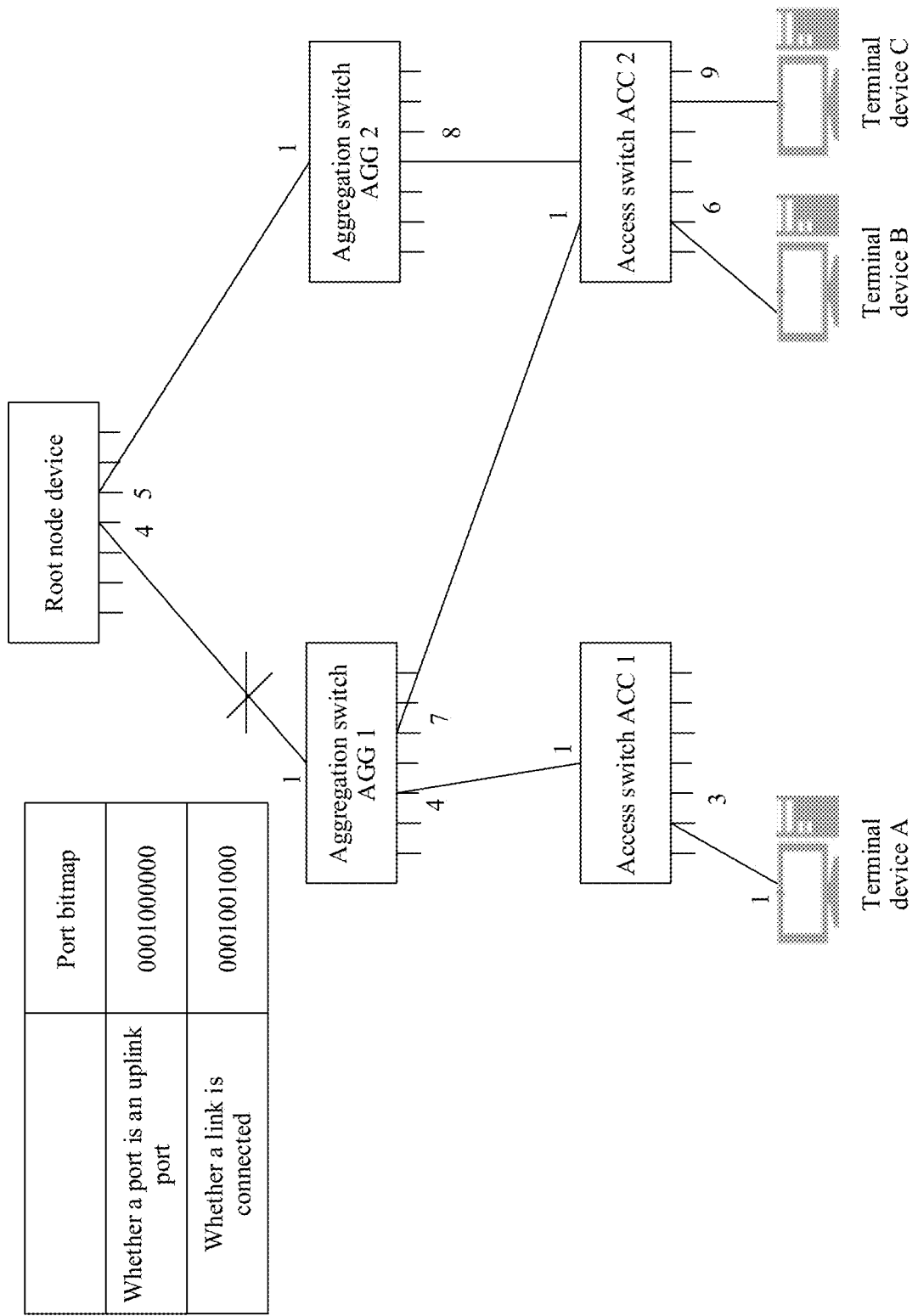
FIG. 10 is a schematic diagram of an example of another link status change.

FIG. 10 shows a schematic diagram of another link status change: a link Root.4<->AGG1.1. A recalculated shortest path from the root node device to the AGG 1 is Root.5<->AGG2.1, AGG2.8<->ACC2.2, and ACC2.1<->AGG1.7. Before the link is disconnected, a role of the AGG 1.7 is a downlink port. Therefore, the role of the AGG 1.7 needs to be updated based on the recalculated shortest path. After a link disconnection event occurs, the AGG 1 changes from a directly connected device to an indirectly connected device of the root node device. Therefore, the root node device sends a port role update message in a source routing manner. The root node device constructs the port role update message. The message carries an identifier of a target device (an identifier of the AGG 1), an identifier of a target port (an identifier of the AGG 1.7), and role information. Then the root node device encapsulates identifiers of egress ports (the AGG 2.8 and the ACC 2.1) along the route, and sends the message to the AGG 1 in the source routing manner. After receiving the message, the AGG 2 discovers that the message carries the identifiers of the egress ports, parses out the identifier of the egress port, removes the identifier of the AGG 2.8, and forwards the message through the egress port AGG 2.8 that is parsed out. After receiving the message, the ACC 2 discovers that the message carries the identifier of the egress port, parses out the identifier of the egress port, removes the identifier of the ACC 2.1, and forwards the message through the egress port ACC 2.1 that is parsed out. After receiving the message, the AGG 1 detects that the message does not carry an identifier of an egress port, and it indicates that the message should be processed by the AGG 1. The AGG 1 parses a type of the message as a port role update message type, further parses out the target port and the role information, and updates the AGG 1.7 to an uplink port based on the role information. The AGG 1 constructs a port role update acknowledge message and sends the port role update acknowledge message through the uplink port. The downlink port of the ACC 2 receives the acknowledge message and forwards the acknowledge message to the AGG 2 through the uplink port. The downlink port of the AGG 2 receives the acknowledge message and forwards the acknowledge message to the root node device through the uplink port. The acknowledge message is used to indicate whether a role update succeeds or fails. The root node device receives the acknowledge message. If the acknowledge message indicates that the role update succeeds, it indicates that the operation succeeds, and a topology structure is refreshed. If the acknowledge message indicates that the role update fails, it indicates that the operation fails.

As shown in FIG. 10, a port bitmap of the AGG 1 includes a bitmap of a port status and a bitmap of a link connection. In the bitmap of the port status and the bitmap of the link connection, identifiers of ports are AGG 1.1, AGG 1.2, . . . , and AGG 1.10 from right to left. In the bitmap of the port status, a bit "0" indicates that the port is a downlink port, and a bit "1" indicates that the port is an uplink port. Through the foregoing role update operation, a port status value of the AGG 1.7 is updated from the bit "0" to the bit "1". If a link corresponding to the AGG 1.1 is disconnected, a same role update operation may also be performed. The AGG 1.1 is updated from the uplink port to the downlink port. A port status value of the AGG 1.1 is updated from the bit "1" to the bit "0". In the bitmap of the link connection, the bit "0" indicates that a link corresponding to the port is not connected, and the bit "1" indicates that a link corresponding to the port is connected. Currently, links of ports AGG 1.4 and AGG 1.7 are both connected, and bit values corresponding to these ports are "1".

According to the network topology discovery method provided in this embodiment of this application, when detecting that a status of a link changes, the root node device may re-modify a role of a port of a child node device on the link through calculation, so as to refresh a topology structure.

Figure 11:
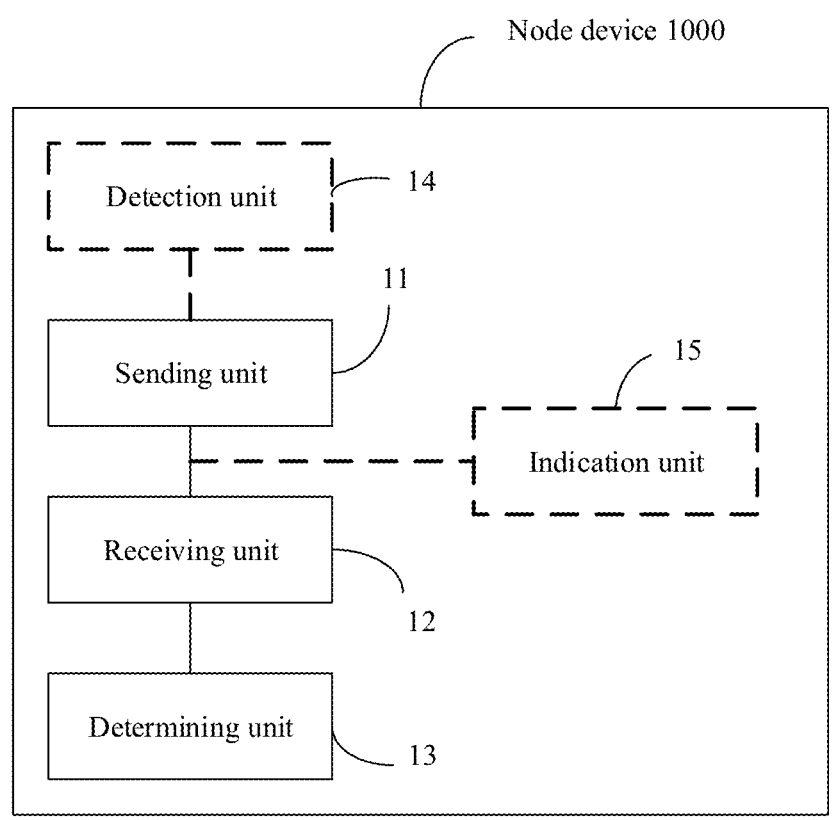
FIG. 11 is a schematic diagram of a structure of a node device according to an embodiment of this application.

Based on a same concept of the network topology discovery methods in the foregoing embodiments, as shown in FIG. 11, an embodiment of this application further provides a node device 1000. The node device 1000 may be applied to the network topology discovery methods shown in FIG. 3, FIG. 4, FIG. 6A and FIG. 6B, and FIG. 8. The node device 1000 may be the root node device in the foregoing network topology discovery methods. The node device 1000 includes a sending unit 11, a receiving unit 12, and a determining unit 13. The node device 1000 may further include a detection unit 14 and an indication unit 15. An example is as follows:

The sending unit 11 is configured to send a link discovery message to a child node device through a first port.

The receiving unit 12 is configured to receive a link discovery acknowledge message sent by the child node device through a second port of the child node device. The link discovery acknowledge message includes an identifier of the child node device and an identifier of the second port.

The determining unit 13 is configured to determine a first link based on the link discovery acknowledge message. The first link is a link between the first port and the second port.

In an embodiment, the detection unit 14 is configured to detect that a link corresponding to the first port is connected.

In another embodiment, the indication unit 15 is configured to indicate, based on the first link, the child node device to set the second port to an uplink port.

In another embodiment, the sending unit 11 is configured to send a port role update message to the child node device through the first port. The port role update message includes the identifier of the child node device, the identifier of the second port, and role information of the second port. The port role update message is used to indicate the child node device to set a role based on the role information of the second port.

The receiving unit 12 is configured to receive a port role update acknowledge message sent by the child node device through the second port.

In another embodiment, the sending unit 11 is configured to: if the child node device is a first-time discovery device, send a device discovery message to the child node device through the first port. The device discovery message includes the identifier of the child node device.

The receiving unit 12 is configured to receive a device discovery acknowledge message sent by the child node device through the second port. The device discovery acknowledge message includes the identifier of the child node device, and identifiers, statuses, and port capabilities of all ports of the child node device.

In another embodiment, a first child node device is directly connected to the root node device. A second child node device is indirectly connected to the root node device. The receiving unit 12 is configured to receive a port status change message sent by the first child node device. The port status change message is used to indicate that there is a link connection between a third port of the first child node device and a fourth port of the second child node device.

In another embodiment, the link discovery message includes an identifier of at least one egress port, the port role update message includes an identifier of at least one egress port, and the device discovery message includes an identifier of at least one egress port.

In another embodiment, the determining unit 13 is further configured to: when it is detected that a status of the first link changes, determine a child node device whose port role needs to be updated.

The sending unit 11 is configured to send, through a second link, the port role update message to the child node device whose port role needs to be updated. The port role update message includes an identifier of an egress port of an intermediate child node device between the root node device and the child node device whose port role needs to be updated.

The receiving unit 12 is configured to receive the port role update acknowledge message.

For more detailed descriptions of the foregoing units, refer to related descriptions of the root node device in the embodiments shown in FIG. 3, FIG. 4, FIG. 6A and FIG. 6B, and FIG. 8. Details are not described herein again.

According to the node device provided in this embodiment of this application, when detecting that a link of a port is connected, the root node device discovers an existing topology relationship through message interaction, so as to implement network topology discovery.

Figure 12:
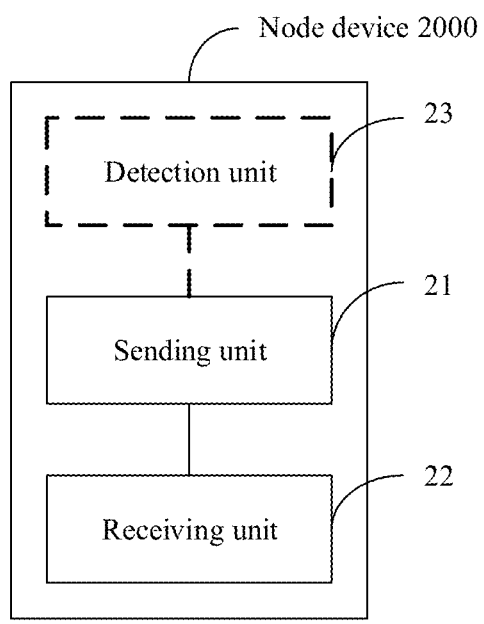
FIG. 12 is a schematic diagram of a structure of a child node device according to an embodiment of this application.

Based on a same concept of the network topology discovery methods in the foregoing embodiments, as shown in FIG. 12, an embodiment of this application further provides a child node device 2000. The child node device 2000 may be applied to the network topology discovery methods shown in FIG. 3, FIG. 4, FIG. 6A and FIG. 6B, and FIG. 8. The child node device 2000 includes a receiving unit 21 and a sending unit 22, and may further include a detection unit 23. An example is as follows:

The receiving unit 21 is configured to receive a link discovery message sent by a root node device. The link discovery message includes an identifier of a third port.

The sending unit 22 is configured to forward the link discovery message to a second child node device through the third port.

The receiving unit 21 is further configured to receive a link discovery acknowledge message sent by the second child node device through a fourth port. The link discovery acknowledge message includes an identifier of the second child node device and an identifier of the fourth port.

The sending unit 22 is further configured to send the link discovery acknowledge message to the root node device.

In an embodiment, the detection unit 23 is configured to detect that there is a link connection between the third port of a first child node device and the fourth port of the second child node device.

The sending unit 22 is configured to send a port status change message to the root node device. The port status change message is used to indicate that there is a link connection on the third port.

In another embodiment, the receiving unit 21 is configured to receive a port role update message sent by the root node device. The port role update message includes the identifier of the second child node device, the identifier of the third port, the identifier of the fourth port, and role information of the fourth port. The port role update message is used to indicate the second child node device to set a role based on the role information of the fourth port.

The sending unit 22 is configured to send the port role update message to the second child node device through the third port.

The receiving unit 21 is further configured to receive, through the fourth port, a port role update acknowledge message sent by the second child node device.

The sending unit 22 is further configured to send the port role update acknowledge message to the root node device.

In another embodiment, the receiving unit 21 is configured to: if the second child node device is a first-time discovery device, receive a device discovery message sent by the root node device. The device discovery message includes the identifier of the second child node device and the identifier of the third port.

The sending unit 22 is configured to send the device discovery message to the second child node device through the third port.

The receiving unit 21 is further configured to receive, through the fourth port, a device discovery acknowledge message sent by the second child node device. The device discovery acknowledge message includes the identifier of the second child node device, and identifiers, statuses, and port capabilities of all ports of the second child node device.

The sending unit 22 is further configured to send the device discovery acknowledge message to the root node device.

For more detailed descriptions of the foregoing units, refer to related descriptions of the intermediate child node device in the embodiments shown in FIG. 3, FIG. 4, FIG. 6A and FIG. 6B, and FIG. 8. Details are not described herein again.

According to the node device provided in this embodiment of this application, when detecting that a link of a port is connected, the node device discovers an existing topology relationship through message interaction, so as to implement network topology discovery.

Figure 13:
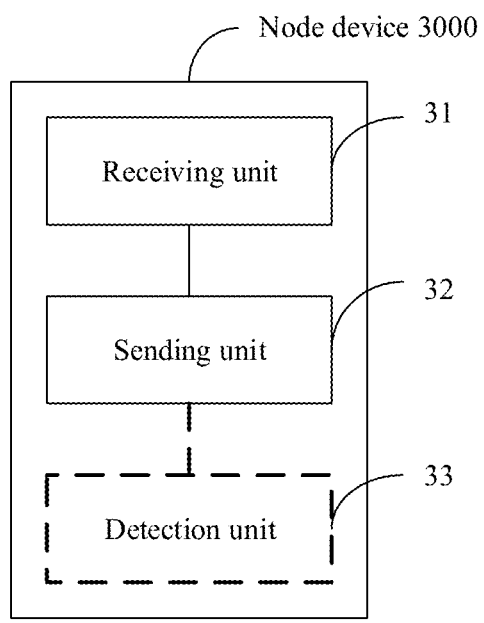
FIG. 13 is a schematic diagram of a structure of another child node device according to an embodiment of this application.

Based on a same concept of the network topology discovery methods in the foregoing embodiments, as shown in FIG. 13, an embodiment of this application further provides a node device 3000. The node device 3000 may be applied to the network topology discovery methods shown in FIG. 3, FIG. 4, FIG. 6A and FIG. 6B, and FIG. 8. The node device 3000 includes a receiving unit 31 and a sending unit 32, and may further include a setting unit 33. An example is as follows:

The receiving unit 31 is configured to receive a link discovery message sent by a root node device through a first port.

The sending unit 32 is configured to send a link discovery acknowledge message to the root node device through a second port. The link discovery acknowledge message includes an identifier of a child node device and an identifier of the second port.

In an embodiment, the receiving unit 31 is configured to receive a port role update message sent by the root node device through the first port. The port role update message includes the identifier of the child node device, the identifier of the second port, and role information of the second port. The port role update message is used to indicate the child node device to set a role based on the role information of the second port.

The setting unit 33 is configured to set a role for the second port based on the role information of the second port.

The sending unit 32 is configured to send a port role update acknowledge message to the root node device through the second port.

In another embodiment, the receiving unit 31 is configured to: if the child node device is a first-time discovery device, receive a device discovery message sent by the root node device through the first port. The device discovery message includes the identifier of the child node device.

The sending unit 32 is configured to send a device discovery acknowledge message to the root node device through the second port. The device discovery acknowledge message includes the identifier of the child node device, and identifiers, statuses, and port capabilities of all ports of the child node device.

In another embodiment, a first child node device is directly connected to the root node device. A second child node device is indirectly connected to the root node device. The sending unit 32 is configured to send a port status change message to the root node device. The port status change message is used to indicate that there is a link connection between a third port of the first child node device and a fourth port of the second child node device.

In another embodiment, the link discovery message includes an identifier of at least one egress port, the port role update message includes an identifier of at least one egress port, and the device discovery message includes an identifier of at least one egress port.

For more detailed descriptions of the foregoing units, refer to related descriptions of the child node device in the embodiments shown in FIG. 3, FIG. 4, FIG. 6A and FIG. 6B, and FIG. 8. Details are not described herein again.

According to the child node device provided in this embodiment of this application, when detecting that a link of a port is connected, the node device discovers an existing topology relationship through message interaction, so as to implement network topology discovery.

Figure 14:
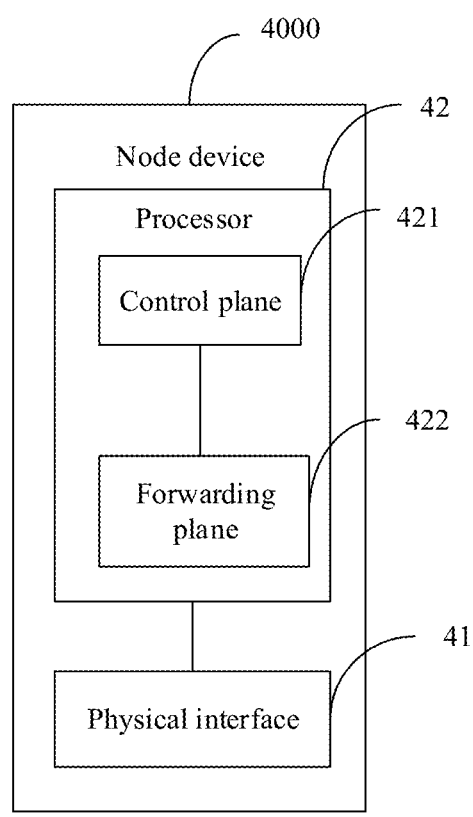
FIG. 14 is a schematic diagram of a structure of a node device according to an embodiment of this application.

An embodiment of this application further provides a node device. FIG. 14 is a schematic diagram of a structure of a node device according to an embodiment of this application. A node device 4000 includes a physical interface 41 and a processor 42. The physical interface 41 is configured to send and receive messages. The processor 42 is configured to perform the method operations performed by the root node device, the intermediate child node device, or the target child node device in FIG. 3, FIG. 4, FIG. 6A and FIG. 6B, and FIG. 8.

There may be one or more physical interfaces 41. The physical interface 41 may include a wireless interface and/or a wired interface. For example, the wireless interface may include a WLAN interface, a Bluetooth interface, a cellular network interface, or any combination thereof. The wired interface may include an Ethernet interface, an asynchronous transfer mode interface, a fiber channel interface, or any combination thereof. The Ethernet interface may be an electrical interface or an optical interface. The physical interface 41 does not necessarily include (although typically includes) the Ethernet interface.

There may be one or more processors 42. The processor 42 includes a central processing unit, a network processor, a graphics processing unit (GPU), an application-specific integrated circuit, a programmable logic device, or any combination thereof. The PLD may be a complex programmable logic device, a field programmable gate array, a generic array logic, or any combination thereof. The processor 42 may include a control plane 421 and a forwarding plane 422. The control plane 421 and the forwarding plane 422 may be implemented by independent circuits, or may be integrated into one circuit. For example, the processor 42 is a multi-core CPU. One or some of a plurality of cores implements/implement the control plane 421, and other cores implement the forwarding plane 422. For another example, the control plane 421 is implemented by a CPU, and the forwarding plane 422 is implemented by an NP, an ASIC, an FPGA, or any combination thereof. For another example, the node device is a modular network device, the control plane 421 is implemented by a main control card, and the forwarding plane 422 is implemented by a line card. For another example, both the control plane 421 and the forwarding plane 422 are implemented by an NP having a control plane capability.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed systems, apparatuses, and methods may be implemented in other manners. For example, division into the units is merely logical function division and may be another division in actual implementation. For example, a plurality of units or components may be combined or integrated into another system, or some features may be ignored or not performed. The displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state drive (SSD).

What is claimed is:

1. A network topology discovery method, comprising:
   sending a link discovery message to a child node device through a first port;
   receiving a link discovery acknowledge message sent by the child node device through a second port of the child node device, wherein the link discovery acknowledge message comprises an identifier of the child node device and an identifier of the second port;
   determining a first link based on the link discovery acknowledge message, wherein the first link is a link between the first port and the second port; and
   sending a port role update message to the child node device through the first port to indicate to the child node device to set the second port of the child node device to an uplink port, wherein the port role update message comprises the identifier of the child node device, the identifier of the second port, and role information of the second port, and the port role update message is used to indicate the child node device to set a role based on the role information of the second port.

2. The method according to claim 1, further comprising:
   receiving a port role update acknowledge message sent by the child node device through the second port.

3. The method according to claim 1, further comprising:
   if the child node device is a first-time discovery device, sending a device discovery message to the child node device through the first port, wherein the device discovery message comprises the identifier of the child node device; and
   receiving a device discovery acknowledge message sent by the child node device through the second port, wherein the device discovery acknowledge message comprises the identifier of the child node device, and identifiers, statuses, and port capabilities of all ports of the child node device.

4. The method according to claim 3, further comprising:
   before the sending a link discovery message to a child node device through a first port, receiving a port status change message sent by a first child node device, wherein the port status change message is used to indicate that there is a link connection between a third port of the first child node device and a fourth port of a second child node device, wherein the first child node device is directly connected to a root node device, the second child node device is indirectly connected to the root node device.

5. The method according to claim 4, wherein the link discovery message comprises an identifier of at least one egress port, a port role update message comprises an identifier of at least one egress port, and the device discovery message comprises an identifier of at least one egress port.

6. The method according to claim 1, further comprising:
   when it is detected that a status of the first link changes, determining a child node device whose port role needs to be updated;
   sending, through a second link, a port role update message to the child node device whose port role needs to be updated, wherein the port role update message comprises an identifier of an egress port of an intermediate child node device between a root node device and the child node device whose port role needs to be updated; and
   receiving a port role update acknowledge message.

7. A network topology discovery method, comprising:
   receiving a link discovery message sent by a root node device through a first port;
   sending a link discovery acknowledge message to the root node device through a second port, wherein the link discovery acknowledge message comprises an identifier of a child node device and an identifier of the second port; and
   receiving a port role update message sent by the root node device through the first port, wherein the port role update message comprises the identifier of the child node device, the identifier of the second port, and role information of the second port, and the port role update message is used to indicate the child node device to set a role based on the role information of the second port.

8. The method according to claim 7, further comprising:
   setting a role for the second port based on the role information of the second port; and
   sending a port role update acknowledge message to the root node device through the second port.

9. The method according to claim 7, further comprising:
   if the child node device is a first-time discovery device, receiving a device discovery message sent by the root node device through the first port, wherein the device discovery message comprises the identifier of the child node device; and
   sending a device discovery acknowledge message to the root node device through the second port, wherein the device discovery acknowledge message comprises the identifier of the child node device, and identifiers, statuses, and port capabilities of all ports of the child node device.

10. The method according to claim 9, further comprising:
    sending a port status change message to the root node device, wherein the port status change message is used to indicate that there is a link connection between a third port of a first child node device and a fourth port of a second child node device, wherein the first child node device is directly connected to the root node device, the second child node device is indirectly connected to the root node device.

11. The method according to claim 10, wherein the link discovery message comprises an identifier of at least one egress port, wherein a port role update message comprises an identifier of at least one egress port, and the device discovery message comprises an identifier of at least one egress port.

12. A node device, comprising:
    one or more processors; and
    a non-transitory computer-readable memory storing a program to be executed by the one or more processors, the program including instructions that, when executed by the one or more processors, cause the node device to:
    send a link discovery message to a child node device through a first port;

receive a link discovery acknowledge message sent by the child node device through a second port of the child node device, wherein the link discovery acknowledge message comprises an identifier of the child node device and an identifier of the second port;

determine a first link based on the link discovery acknowledge message, wherein the first link is a link between the first port and the second port; and send a port role update message to the child node device through the first port, wherein the port role update message comprises the identifier of the child node device, the identifier of the second port, and role information of the second port, and the port role update message is used to indicate the child node device to set a role based on the role information of the second port.

13. The node device according to claim 12, wherein the program further comprises instructions that cause the node device to:

receive a port role update acknowledge message sent by the child node device through the second port.

14. The node device according to claim 12, wherein the program further comprises instructions that cause the node device to:

if the child node device is a first-time discovery device, send a device discovery message to the child node device through the first port, wherein the device discovery message comprises the identifier of the child node device; and receive a device discovery acknowledge message sent by the child node device through the second port, wherein the device discovery acknowledge message comprises the identifier of the child node device, and identifiers, statuses, and port capabilities of all ports of the child node device.

15. The node device according to claim 12, wherein the program further comprises instructions that cause the node device to:

receive a port status change message sent by a first child node device, wherein the port status change message is used to indicate that there is a link connection between a third port of the first child node device and a fourth port of a second child node device, wherein the first child node device is directly connected to a root node device, and the second child node device is indirectly connected to the root node device.

16. The node device according to claim 12, wherein the program further comprises instructions that cause the node device to:

when it is detected that a status of the first link changes, determine a child node device whose port role needs to be updated;

send, through a second link, a port role update message to the child node device whose port role needs to be updated, wherein the port role update message comprises an identifier of an egress port of an intermediate child node device between a root node device and the child node device whose port role needs to be updated; and receive a port role update acknowledge message.

17. A node device, comprising:

one or more processors; and a non-transitory computer-readable memory storing a program to be executed by the one or more processors, the program including instructions that, when executed by the one or more processors, cause the node device to:

receive a link discovery message sent by a root node device through a first port; and send a link discovery acknowledge message to the root node device through a second port, wherein the link discovery acknowledge message comprises an identifier of a child node device and an identifier of the second port; and receive a port role update message sent by the root node device through the first port, wherein the port role update message comprises the identifier of the child node device, the identifier of the second port, and role information of the second port, and the port role update message is used to indicate the child node device to set a role based on the role information of the second port.

18. The node device according to claim 17, wherein the program further comprises instructions that cause the node device to:

set a role for the second port based on the role information of the second port, and send a port role update acknowledge message to the root node device through the second port.

19. The node device according to claim 17, wherein the program further comprises instructions that cause the node device to:

if the child node device is a first-time discovery device, receive a device discovery message sent by the root node device through the first port, wherein the device discovery message comprises the identifier of the child node device; and send a device discovery acknowledge message to the root node device through the second port, wherein the device discovery acknowledge message comprises the identifier of the child node device, and identifiers, statuses, and port capabilities of all ports of the child node device.

* * * * *